US011687664B2

(12) United States Patent
Lin

(10) Patent No.: US 11,687,664 B2
(45) Date of Patent: Jun. 27, 2023

(54) BLOCKCHAIN-BASED FILE STORAGE DEVICE AND FILE ACCESS AUTHORIZATION SYSTEM AND METHOD

(71) Applicant: Hsiu-Te Lin, New Taipei (TW)

(72) Inventor: Hsiu-Te Lin, New Taipei (TW)

(*) Notice: Subject to any disclaimer, the term of this patent is extended or adjusted under 35 U.S.C. 154(b) by 189 days.

(21) Appl. No.: 17/384,959

(22) Filed: Jul. 26, 2021

(65) Prior Publication Data

US 2022/0035936 A1 Feb. 3, 2022

(30) Foreign Application Priority Data

Jul. 28, 2020 (TW) ................. 109125452

(51) Int. Cl.
*G06F 21/00* (2013.01)
*G06F 21/62* (2013.01)
*G06F 21/60* (2013.01)
*H04L 9/32* (2006.01)
(Continued)

(52) U.S. Cl.
CPC ........ *G06F 21/6218* (2013.01); *G06F 21/602* (2013.01); *H04L 9/3073* (2013.01); *H04L 9/3213* (2013.01); *H04L 9/3239* (2013.01); *H04L 9/50* (2022.05)

(58) Field of Classification Search
CPC .... G06F 21/6218; G06F 21/602; G06F 21/64; H04L 9/3073; H04L 9/3213; H04L 9/3239; H04L 9/50; H04L 9/0825; H04L 9/0894; H04L 9/3247; H04L 63/0442; H04L 63/0807
See application file for complete search history.

(56) References Cited

U.S. PATENT DOCUMENTS 10,877,930 B2 12/2020 Lu
2017/0293766 A1* 10/2017 Schnjakin ............ G06F 21/602
2020/0265379 A1* 8/2020 Walker .................. G06N 20/00
(Continued)

FOREIGN PATENT DOCUMENTS

| CN | 110675253 A | 1/2020 |
| TW | 202008203 A | 2/2020 |
| TW | M604432 U | 11/2020 |

OTHER PUBLICATIONS

TW Office Action dated Feb. 16, 2022 in Taiwan application No. 109125452.
(Continued)

*Primary Examiner* — Mahfuzur Rahman
(74) *Attorney, Agent, or Firm* — McClure, Qualey & Rodack, LLP

(57) ABSTRACT

This invention relates generally to blockchain application implementations. It can be used for allowing regular users to obtain formal authorization for accessing files from blockchain powered file storage devices. Before a user accesses a file, a smart contract should be invoked and check if the user device possesses an authorized file access token which is non-fungible token and recorded in the blockchain network. Accordingly, this invention can turn a file abstractly into a token that can be traded or distributed on the internet. Furthermore, these files are encrypted by the access token and binding with it, unauthorized access or illegal copy is not possible. Eventually, Digital File becomes tradable and unique Digital Asset, which will result in a new era of e-commerce transactions. Virtual things Real.

10 Claims, 8 Drawing Sheets

(51) Int. Cl.
    *H04L 9/30*           (2006.01)
    *H04L 9/00*           (2022.01)

(56) References Cited

U.S. PATENT DOCUMENTS

2022/0272117 A1\*   8/2022   Maheve .............. H04L 63/1416
2022/0329584 A1\*  10/2022   Sharma .................... H04L 9/30
2022/0374509 A1\*  11/2022   Balaraman .............. G06F 21/41

OTHER PUBLICATIONS

Search Report issued in TW Office Action dated Feb. 16, 2022 in Taiwan application No. 109125452.

\* cited by examiner

BLOCKCHAIN-BASED FILE STORAGE DEVICE AND FILE ACCESS AUTHORIZATION SYSTEM AND METHOD

BACKGROUND OF THE INVENTION

1. Field of the Invention

The present invention relates to a file storage device and file access authorization system and method based on a blockchain network, in particular to a system and method for file access through a blockchain network, and a storage device for storing the files downloaded through the aforementioned system and method.

2. Description of the Related Art

The blockchain network is essentially a decentralized database, that is, a technical solution for collectively maintaining a reliable database through a decentralized peer-to-peer (P2P) approach. The blockchain network has the characteristics of "decentralization", "openness", "independence", "security", and "anonymity", and has become the most revolutionary and potential internet e-commerce technology since the advent of the World Wide Web (WWW).

"Decentralization" refers to the transfer of control and decision-making from a centralized entity (individual, organization, or group thereof) to a distributed network. Each network node realizes self-verification, transmission and management of information and data. "Openness" refers to the fact that, the data in the blockchain network is open to everyone, with the exception of the encryption of the private information of the parties involved in the transaction. Anyone interested may access the blockchain data and develop related applications through the open interface. The so-called "independent" means that based on consensus norms and agreements, the entire blockchain network does not have to rely on any other third parties, and all the nodes can autonomously and securely verify and exchange data in the blockchain network without human intervention. The most important part is "security". As long as no one is in control of more than half of the entire network nodes, the data or information in the chain could not be arbitrarily manipulated or modified. This makes the blockchain network itself relatively safe, as it is extremely difficult to control more than half of all the data nodes. Finally, with respect to "anonymity", unless required by laws and regulations, technically speaking, the identity information of each network node does not need to be disclosed publicly or verified, and the transmission of the information can be carried out anonymously.

Access to files or data on the internet has always been difficult to control, easy to copy, and difficult to verify the legitimacy of the source. As such, the disputes regarding internet file access and forgery have been long existed, and there is no suitable and easy solution. Taiwanese Patent Publication No. 202008203 entitled "Blockchain-based cross-chain data access method and apparatus" discloses a solution of combining blockchain technology with network data access. However, this prior art merely discloses a cross-chain interconnection operation between different blockchain networks, and data interaction between different blockchain networks, but fail to disclose any file managing and control mechanisms that address the authorization of file access, the verification of the file source, the encryption, decryption and copy protection of the files.

SUMMARY OF THE INVENTION

The primary object of the present invention is to provide a blockchain-based file storage device and file access authorization system and method thereof, which use blockchain tokens for file or information access control to ensure that the file or information access is legitimate, and the security of file storage are kept by encryption via tokens.

To achieve the above object, the present invention provides a file access authorization method based on a blockchain network having at least one user endpoint corresponding to a user device, and at least one content supply endpoint corresponding to a content server, the method comprises the steps of: obtaining, by the user endpoint, a first public key and a first private key from a machine-readable medium, and connecting to a smart contract on the blockchain network via the first public key; the smart contract comprising at least a file access token that corresponds to the first public key; and signing, by the user endpoint, the smart contract with the first private key, to transfer the file access token corresponding to the first public key to the user endpoint; wherein when a request to access a file in the content server is made by the user device, the smart contract provides a link for the user device to access the file in the content server after having authenticated the file access token of the user endpoint.

Given the above, the present invention makes use of the blockchain network technology and the protocol mechanism of the smart contract to allow regular users to obtain formal and legitimate authorization for file access. Prior to each file access, the smart contract will check if the user device to access the file has a file access token, and once the file access token is transferred to a regular user, it is impossible to be tampered with. As such, according to the blockchain-based file access authorization system and method provided by the present invention, flows of file access can be fully controlled, and an illegitimate access can be completely prevented, and thus a safe, reliable and user friendly file access can be reached.

To achieve the foregoing object, the present invention provides a file access authorization system based on a blockchain network having at least one user endpoint corresponding to a user device, and at least one content supply endpoint corresponding to a content server, the user device comprises: an access module; and a storage module communicatively connected to the access module; wherein when a request to access a file in the content server is made by the user device, the access module obtains a first public key and a first private key from a machine-readable medium, and is connected to a smart contract stored on the blockchain network via the first public key; the smart contract comprises at least a file access token that corresponds to the first public key; the access module signs the smart contract with the first private key, so as to transfer the file access token corresponding to the first public key to the user endpoint; the smart contract provides a link for the user device to access the file in the content server after having authenticated the file access token of the user endpoint.

In other words, the present invention further provides a blockchain-based file access authorization system, in which the user device may connect to the blockchain network and perform the transferring of a file access token through the access module, while the storage module performs encryption, storage, decryption, and provision of the file after formally acquires the authorization to access the files.

Furthermore, the blockchain network of the present invention may further comprise an information endpoint corresponding to an information server. In response to a request to obtain an information from the information server or a request to input an information into the information serve made by the user device, the smart contract authenticates the file access token of the user endpoint. In other words, in addition to being used for file access control, the present invention can also be used for reading or writing information or data. As such, the present invention can be implemented to any mechanisms in Internet operations that require authorization to, for example, upload, download, browse and editing, for example, audio/video files, document files, or any other files in any format.

To achieve the foregoing object, the present invention provides a file storage device based on a blockchain network having at least one user endpoint corresponding to the storage device, and at least one content supply endpoint corresponding to a content server. The storage device establishes a connection with the blockchain network through an access device. When a request to access a file in the content server is made by the storage device, the access device obtains a first public key and a first private key from a machine-readable medium, and is connected to a smart contract on the blockchain network via the first public key. The smart contract comprises at least a file access token that corresponds to the first public key. The access device signs the smart contract with the first private key, so as to transfer the file access token corresponding to the first public key to the user endpoint. The smart contract provides a link for the storage device to access the file in the content server after having authenticated the file access token of the user endpoint.

Accordingly, the present invention provides a blockchain-based file storage device, which can be connected to the blockchain network through an external access device, and the storage device of the present invention can acquire the access authorization of the file through the access device. That is, the file storage device can access the content server through any kind of access device. Further, the authorized access files stored in the file storage device can be encrypted for protection. Even if the files are unintentionally leaked, they could not be decrypted by unauthorized devices for use.

DESCRIPTION OF THE PREFERRED EMBODIMENTS

Figure 1:
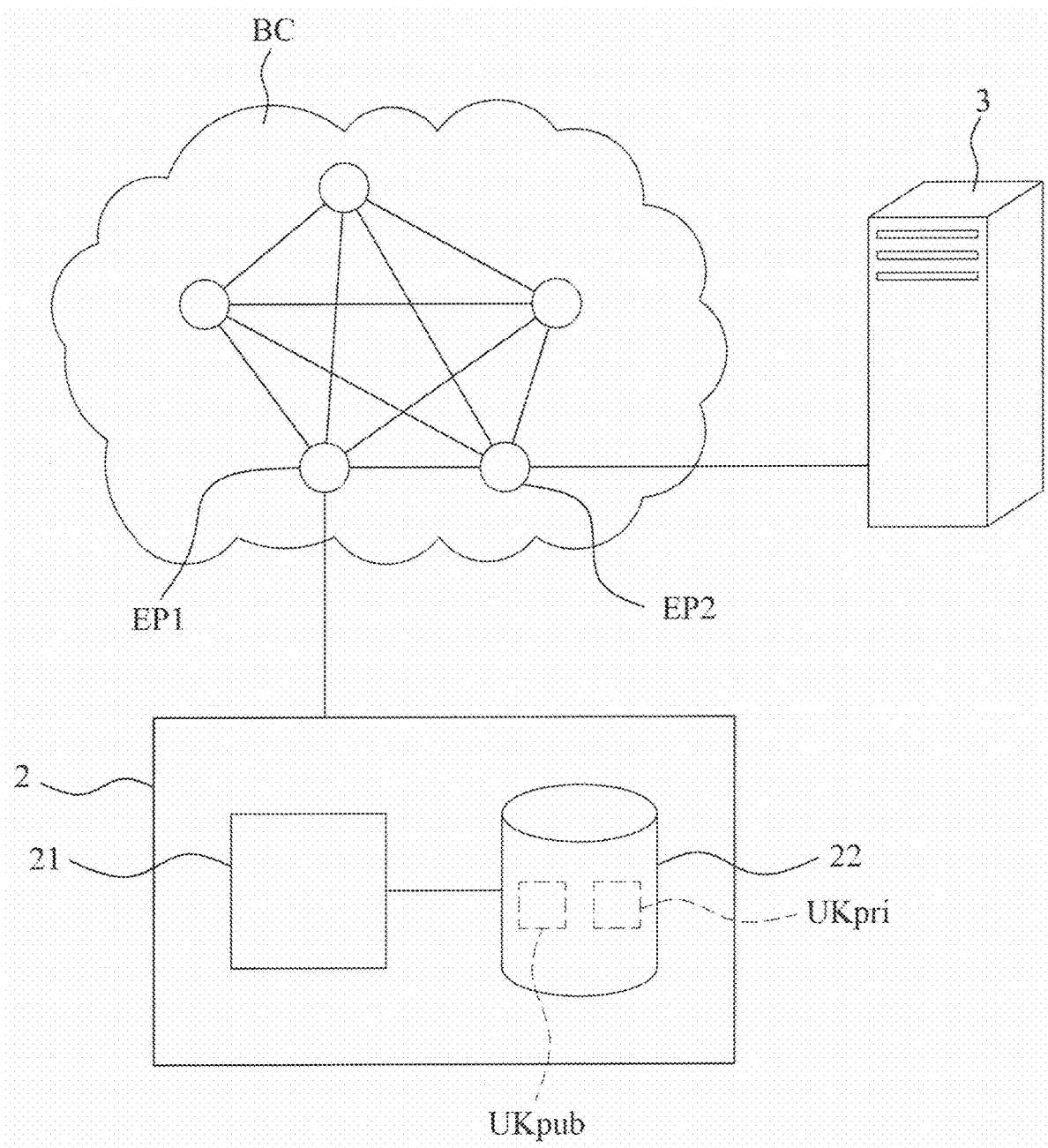
FIG. 1 is a schematic illustration of a system architecture of the first embodiment of the present invention.

The present invention is related to a blockchain-based file storage device and file access authorization system and method. In the description, similar elements will be denoted by the same reference numerals. In addition, the drawings of the present invention are only intended to be illustrative, and are not necessarily drawn to scale, and all details are not necessarily be shown in the drawings. In the following descriptions, the present embodiment shall be described based on the authorization of downloading high-resolution audio, e.g. music. Nonetheless, the present invention shall not be limited to that, and shall include any file in any format that can be transmitted via internet.

Figure 2:
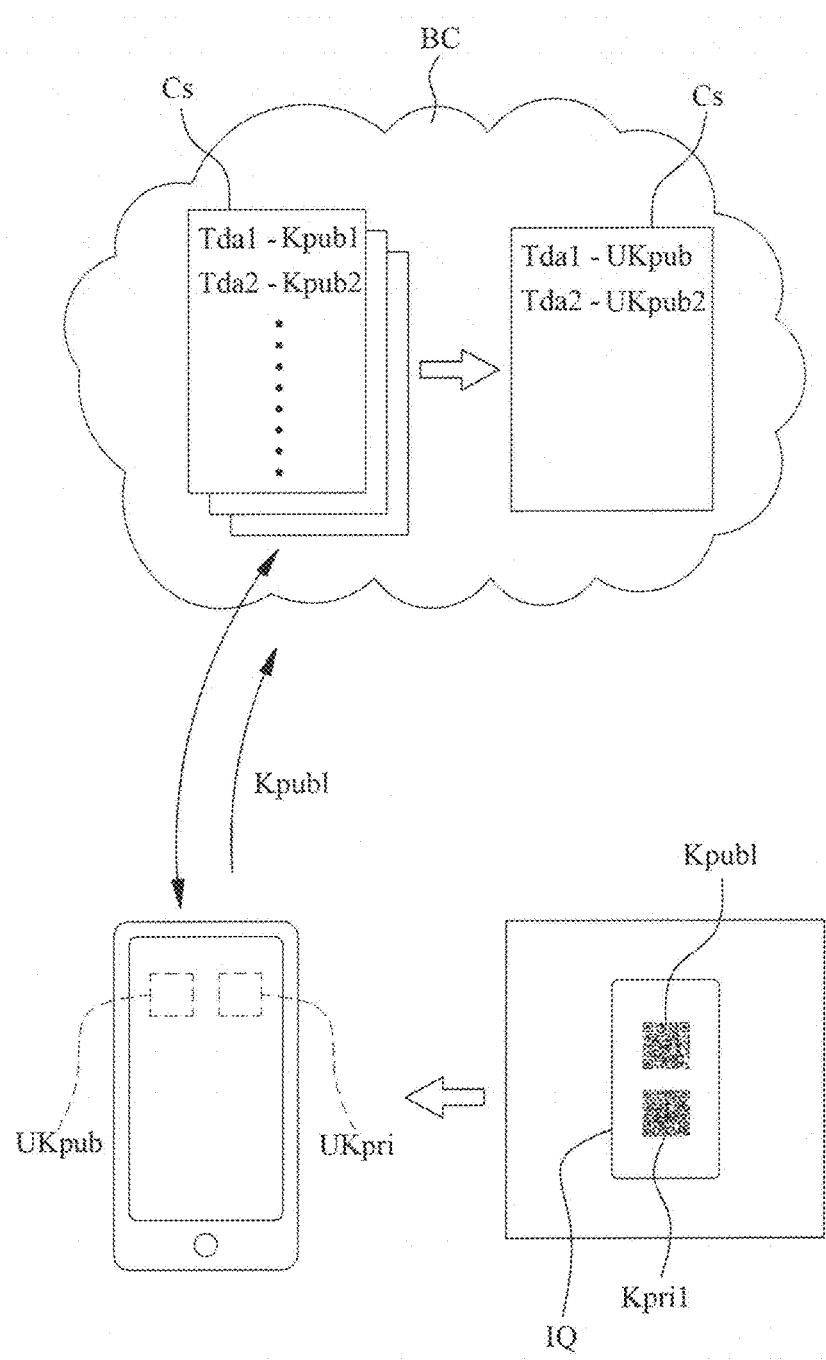
FIG. 2 is a drawing schematically illustrates the access authorization implemented in the first embodiment of the present invention.

With reference to FIGS. 1 and 2, in which FIG. 1 is a schematic illustration of a system architecture according to the first embodiment of the present invention, and FIG. 2 is a drawing schematically illustrates the access authorization implemented in the first embodiment of the present invention. As shown in the figures, the system of this embodiment makes use of a user device 2 to connect to a blockchain network BC having a user endpoint EP1 corresponding to the user device 2, and a content supply endpoint EP2 corresponding to a content server 3, which is a network server configured to store high-resolution music files. The blockchain network BC may be a regular public blockchain network, a private blockchain network, or a consortium blockchain network.

The user device 2 may be a portable electronic device, and a typical implementation device is a computing device with a processor and a storage unit, and the specific form of the computing device may be a personal computer, a laptop computer, a desktop computer, a cellular phone, a smart phone, a personal digital assistant, a media player, a navigation device, an email sending and receiving device, and a game console, a tablet computer, a wearable device, or a combination of any of these devices. As those skilled in the art will appreciate, the user device 2 may include an operating system (e.g., WINDOWS®, OS2, UNIX®, LINUX®, SOLARIS®, MacOS, Android, iOS, etc.) as well as various conventional support software and drivers typically associated with the computing device. Further, the blockchain network may be implemented using technologies such as, for example, Ethereum GETH, PARITY, eth-lightwallet, or other suitable blockchain interface technologies.

The user device 2 of this embodiment is described by taking a smart phone as an example. The user device 2 comprises an access module 21, and a storage module 22 electrically connected to the access module 21. The access module 21 may be configured as part of a software installed on an operating system on user device 2, or may be regarded as a component that may execute calculations, networking and other related instructions, and may include a central processing unit and associated communication components. The storage module 22 may be a storing space built in a regular mobile phone, such as ROM. Furthermore, the storage module 22 stores a user public key UKpub and a user private key UKpri which corresponds to the user endpoint EP1. The public and private keys can be regarded as account numbers and passwords for identification in the blockchain network BC.

In the blockchain network BC, there is a smart contract Cs that records multiple file access tokens (Tda1, Tda2 . . . ) and multiple corresponding public keys (first public key Kpub1, second public key Kpub2 . . . ). Each file access token has a corresponding public key. The file access token of this embodiment is a non-fungible token (NFT), and it can be associated with a particular digital asset (an audio file) and a license to use the asset for a specified purpose. A user that possesses such a token may legitimately access the file. The reason why a non-fungible token (NFT) is used in this embodiment is that, besides the nature as a "token", it is indivisible, irreplaceable, and has unique attributes. Accordingly, NFT is very suitable for used in this embodiment as a certification for file access. It can also be used to represent items such as photos, videos, audio, and other types of digital files.

The implementation process of this embodiment is described hereinafter. Firstly, the user endpoint EP1 obtains a first public key Kpub1 and a first private key Kpri1 from a machine-readable medium IQ, and is connected to a smart contract Cs on the blockchain network BC via the first public key Kpub1. The machine-readable medium IQ may be a QRcode printed on the record CD case. The user would obtain the unique first public key Kpub1 and the first private key Kpri1 after scanning the QRcode with a smart phone. As soon as the smart phone acquires the first public key Kpub1, it is possible to connect to the smart contract Cs on the blockchain network BC through the first public key Kpub1. It should be particularly noted that in this embodiment, the first public key Kpub1 and the first private key Kpri1 are obtained after scanning two separate QRcodes. However, the present invention shall not be limited to this, as other means of obtaining the public and private keys sequentially or simultaneously can also be used in the present invention.

Then, the user endpoint EP1 signs the smart contract Cs with the first private key Kpri1, and then the smart contract Cs is executed to transfer the file access token Tda1 corresponding to the first public key Kpub1 to the user endpoint EP1. That is to say, the smart contract Cs is signed by the first private key Kpri1 obtained in the step of scanning the QRcode, and the user public key UKpub in the storage module 22 is used in place of the first public key Kpub1 corresponding to the file access token Tda1 on the smart contract Cs, and hence the file access token Tda1 is recoded as belonging to the user endpoint EP1. In other words, by means of this step, the ownership of the file access token Tda1 is officially transferred to the user blockchain account, the user endpoint EP1, which means that the user is now authorized to access the file and may download the high-resolution music.

In this embodiment, the first public key Kpub1 and the first private key Kpri1 are obtained by scanning two QRcodes separately. That is, the first public key Kpub1 is obtained by scanning the first QRcode, which is then connected to the smart contract Cs on the blockchain network BC. Then, the first private key Kpri1 is obtained by scanning the second QRcode, which is used to sign the smart contract Cs. The user public key UKpub is then written into the smart contract Cs to overwrite the first public key Kpub1 corresponding to the file access token Tda1. The above series of steps are automatically processed by scanning the QRcodes.

Furthermore, when a user intends to access a file in the content server 3, for example, to download the high-resolution music file, the smart contract Cs is first executed to verify if the file access token Tda1 belongs to the user endpoint EP1 by checking if the public key corresponding to the file access token Tda1 on the smart contract Cs is the user public key UKpub of the user. If positive, the smart contract Cs will provide a link to access the file in the content server 3 for the user device 2 to download the file.

After the user device 2 obtains the music file from the content server 3, the file is encrypted by the user device 2 with the user public key UKpub of the user endpoint EP1. However, when the user device 2 intends to access the file, for example to play the music file, the file must first be decrypted with the user private key UKpri of the user endpoint EP1 before the music file can be played normally. Accordingly, even if the file is leaked unexpectedly or distributed intentionally, it will not be easily decrypted and used. Furthermore, the above embodiment can be implemented by software, or by hardware or a combination of software and hardware. Taking software implementation as an example, as an apparatus in a logical sense, it is formed by reading the corresponding computer program instructions in the non-volatile memory into the memory through the processor of the electronic device where it is located.

Given the above embodiment, it is apparent that the user can have an access of the file simply by scanning the QRcodes with a smart phone, and the right to access the file could not be tampered with after it is obtained. That is to say, it is almost impossible to misappropriate the right to access the file, and one can have the right for life. In this way, not only the value of physical album is increased, which will in turn enhance the users' purchase intentions, but also the consumers are granted with the legal and permanent rights to the digital contents. As such, the development of the physical albums and music industry can be promoted.

Figure 3:
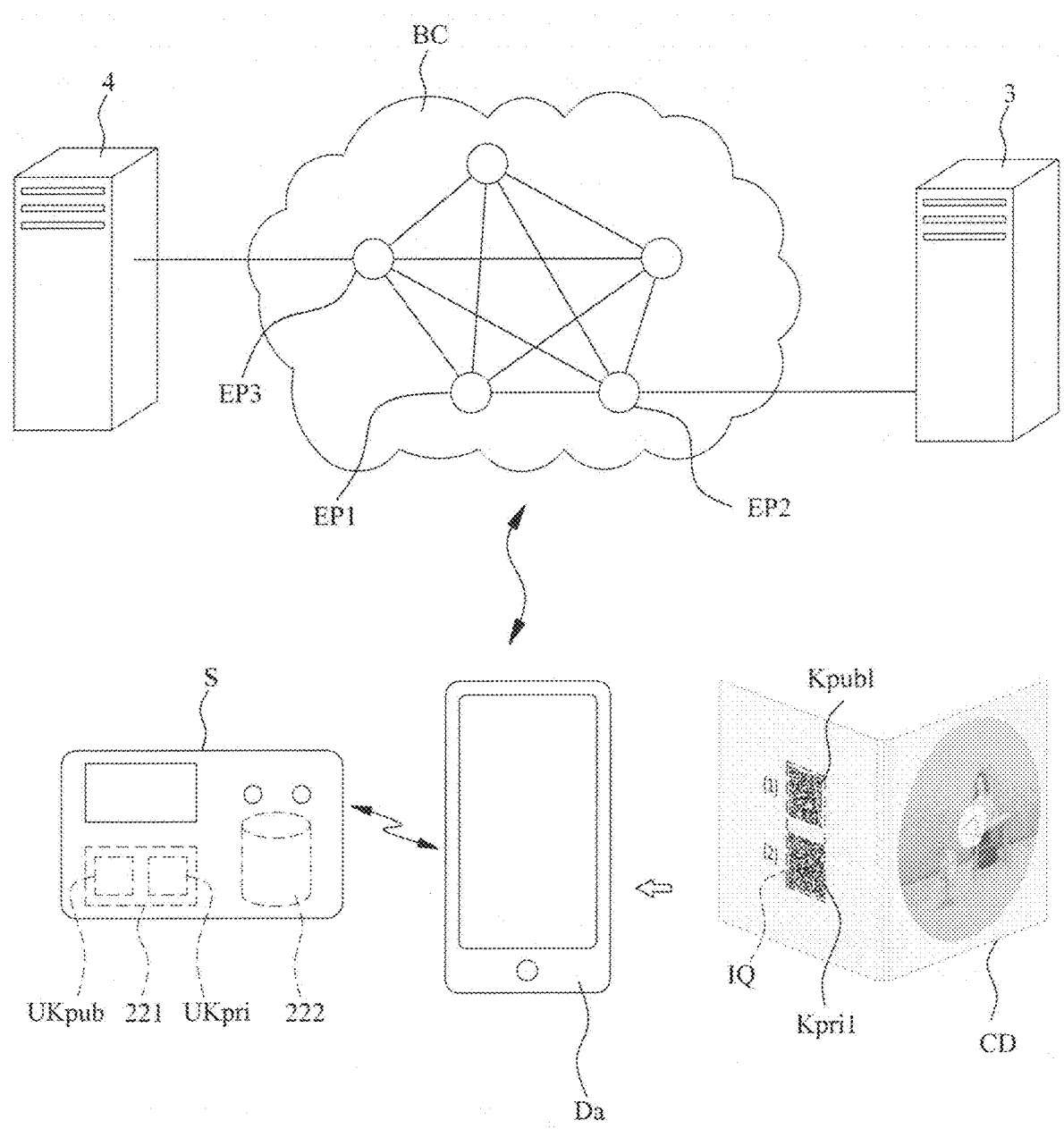
FIG. 3 is a schematic illustration of the second embodiment of the present invention.
Figure 4:
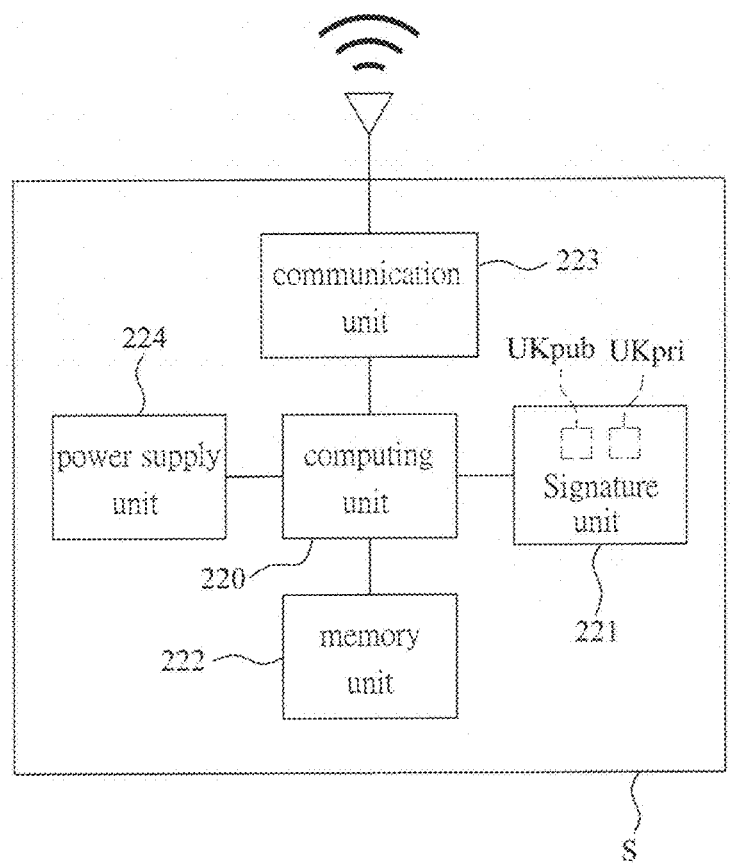
FIG. 4 is a schematic illustration of a system architecture of a storage device according to the second embodiment of the present invention.

Referring now to FIGS. 3 and 4, in which FIG. 3 is a schematic illustration of a second embodiment of the present invention, and FIG. 4 is a schematic illustration of a system architecture of a storage device according to the second embodiment of the present invention. The main difference between this embodiment and the first embodiment mentioned above is that in this embodiment, the storage module 22 of the first embodiment is formed as an independent unit, a storage device S. The storage device S may be a portable device with built-in user public and private keys, and has storage space, such as a cold wallet device. As such, the storage device S becomes a dedicated music storage space, and can be used with any music player devices for playback, or with any networked devices for downloading the music.

The storage device S according to this embodiment comprises a computing unit 220, a signature unit 221, a memory unit 222, a communication unit 223, and a power supply unit 224. The computing unit 220 is electrically connected to the signature unit 221, the memory unit 222, the communication unit 223, and the power supply unit 224. The signature unit 221 is configured to store the user public key UKpub and the user private key UKpri. The memory unit 222 is configured to store the downloaded music file. The communication unit 223 is communicatively connected to the access device Da in a wireless or wired communication manner. The power supply unit 224 is configured to supply power to the computing unit 220, the signature unit 221, the memory unit 222, and the communication unit 223. In addition to the computing unit 220, the signature unit 221, the memory unit 222, the communication unit 223, and the power supply unit 224 shown in FIG. 4, the storage device S in the embodiment may generally include other hardware according to the actual function of the electronic device, details of which will not be described herein.

The computing unit 220 may be configured to process instructions for execution within the storage device S. The computing unit 220 may include single-threaded processor(s), multi-threaded processor(s), or both. The computing unit 220 may be configured to process instructions stored in the memory unit 222 and/or the access device Da. The computing unit 220 may include hardware-based processor(s) each including one or more cores. The computing unit 220 may include general purpose processor(s), special purpose processor(s), or both.

The memory unit 222 and the signature unit 221 may respectively include a transitory memory, a random access memory (RAM), and/or a non-volatile memory in a computer-readable medium, such as a read-only memory (ROM) or a flash RAM. Both the memory unit 222 and the signature unit 221 are examples of a computer-readable medium. The computer-readable medium includes either permanent or non-permanent, either removable or non-removable medium, which can store information by any method or technology. Information may be computer-readable instructions, data structures, modules of a program, or other data. Examples of computer storage media include, but are not limited to, a static random access memory (SRAM), a dynamic random access memory (DRAM), other types of random access memory (RAM), and an electrically erasable programmable read-only memory (EEPROM), a flash memory or other memory technologies can be used to store information that can be accessed by computing devices. As defined herein, computer-readable media does not include temporary computer-readable media (transitory media), such as modulated data signals and carrier waves.

The communication unit 223 may include one or more network interface controllers (NICs) or other types of transceiver devices configured to send and receive communications over one or more networks using any network protocol. In some implementations, the storage device S may communicate with the access device Da, or with other device, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 4G, 5G, Edge, etc.), and so forth. In some implementations, the communications between the storage device S and the access device Da may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

Figure 5A:
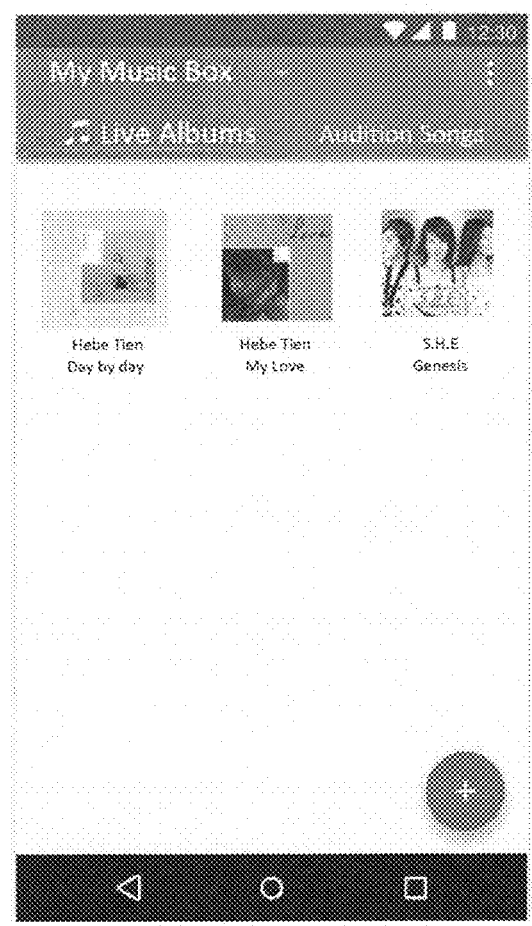
FIGS. 5A to 5D are schematic illustrations of the user interfaces of the second embodiment of the present invention.
Figure 5B:

Referring now to FIGS. 5A and 5B, in which FIGS. 5A to 5B are schematic illustrations that show the user interfaces of the second embodiment of the present invention. The operation proceedings of this embodiment are described as follows. Firstly, the APP is initiated via the smart phone to enable the smart phone to serve as the access device Da which establishes a connection with the storage device S. In this embodiment, the Bluetooth communication protocol is used as the connection mechanism between the access device Da and the storage device S. At this instant, the APP will display the music files that are pre-stored in the storage device S, as shown in FIG. 5A.

Next, scans the machine-readable medium IQ on the physical record CD via the smart phone (i.e. access device Da), as shown in FIG. 3. That is, the QRcode located above is scanned to obtain the first public key Kpub1 so that the access device Dais directly connected to the blockchain network BC and accessed to a smart contract. Subsequently, the QRcode located below is scanned to obtain the first private key Kpri1 to sign the smart contract. At this time, a file access token that corresponds to the original first public key Kpub1 is transferred to the user endpoint EP1, that is to say, the user represented by the storage device S now officially possesses the file access token and may legally download the high sound resolution music file.

Furthermore, when the storage device S wants to download the music file in the content server 3, the smart contract Cs verifies if the user public key UKpub of the user endpoint EP1 corresponds to the file access token Tda1, and the user interface as shown in FIG. 5B will be displayed on the access device Da if positive, which implies that the user may download the file now as desired. After complete downloading, that is after the storage device S obtains the music file from the content server 3 through the access device Da, the downloaded file will be encrypted by the computing unit 220 with the user public key UKpub, and the encrypted file stored in the memory unit 222. On the other hand, when the music file is to be played, the computing unit 220 decrypts the file with the user private key UKpri in the signature unit 221, and transmits the decrypted file to the device Da or other playback devices in a streaming manner for playback.

In conclusion, the present embodiment which adopts storage device S dedicated to music files is advantageous in that it is easy to manage, may store high-quality music file without any loss, is not restricted to specific networked devices (i.e. access devices), and may connect with any playback devices, such as high-resolution audio equipment. As such, the users may enjoy an excellent music feast, and store the files for good, and may re-download the files if they are accidentally damaged or lost. Accordingly, the utilization value of the entity albums and the musical digital contents are greatly improved.

Besides for downloading music, the system, method or device according to the present invention are also suitable for transmitting electronic files of any format, such as word processing files, image files, graphic files, video files, multimedia files, database documents, computer programs, hypertext documents, and data documents through internet. On the other hand, the present invention is not limited to the access of electronic files, but can also be applied to various information flow and interaction modes through the internet, in particular, the reading or writing of information, messages or data, as shall be described hereinafter.

Figure 5C:
Figure 5D:
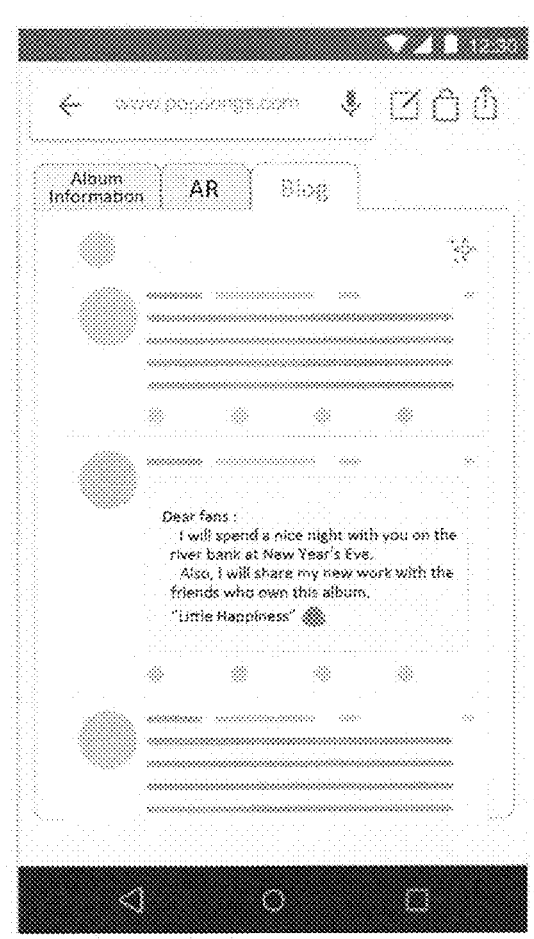

Referring to FIGS. 3, 5C and 5D, in which FIGS. 5C and 5D are schematic illustrations showing the user interfaces of the second embodiment of the present invention. The blockchain network BC of this embodiment further comprises an information endpoint EP3 corresponding to an information server 4 which provides information associated with the physical albums or the artists. Likewise, when the user device 2 intends to read a information in or write a information into the information server 4, the smart contract Cs will execute the reading or writing of the information after authenticating the file access token of the user endpoint EP1.

In other words, as shown in FIG. 5C, when a user intends to browse a physical album through augmented reality (AR), after the smart contract verifies that the storage device S possesses the file access token, connection to the information server 4 will be made to access AR. In addition, as shown in FIG. 5D, when the user intends to browse the private blog of a recording artist, the smart contract will also first verify if the storage device S has the file access token, and allow the browsing and access of the private blog only after conforming. Accordingly, this embodiment will provide the consumers of the physical albums with an exclusive interaction with the singer, such as an instant chat room, a live broadcast room, and a private fan club. Further, the music companies can provide the singers and fans with interactive activity information, which increase the incentives of the consumers to buy the physical album commodity.

In summary, the main concept of the present invention is to place the physical album entity on the blockchain network as a digital asset, which may store the digital contents associated with the permanent ownerships of the consumers, and the digital contents may be continuously updated by the original creator to breathe life into the physical album contents. In this way, for example, CD records may turn into App websites that may automatically update itself, thereby increasing the incentives of the consumers to buy and collect. That is to say, the invention would provide the benefits of both physical publications and digital contents.

Various functional components or blocks have been described herein. As will be appreciated by persons skilled in the art, in many embodiments, the functional blocks will be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems. As well, in embodiments implemented using general purpose circuits, which operate under the control of one or more processors and coded instructions, the general-purpose circuitry becomes a special-purpose machine, once the instructions are loaded.

While various exemplary embodiments of the disclosure have been described above, it should be understood that they have been presented for purposes of example only, not limitations. Modifications and variations are possible in light of the above teachings or may be acquired from practicing of the disclosure, without departing from the breadth or scope of the present invention.

What is claimed is:

1. A file access authorization method based on a blockchain network having at least one user endpoint corresponding to a user device, and at least one content supply endpoint corresponding to a content server, the method comprising the steps of:
   (A) obtaining from a machine-readable medium, by the user endpoint, a first public key and a first private key, and connecting the user endpoint to a smart contract stored in the blockchain network through the first public key, the smart contract comprising at least one file access token corresponding to the first public key; and
   (B) signing, by the user endpoint, the smart contract with the first private key for transferring the file access token corresponding to the first public key to the user endpoint;
   wherein the smart contract, in response to a request made by the user device to access a file in the content server, provides a link for the user device to access the file after having authenticated the file access token of the user endpoint.

2. The method of claim 1, wherein in the step (B), the first public key corresponding to the file access token of the smart contract is replaced with a user public key of the user endpoint for transferring the file access token to the user endpoint.

3. The method of claim 2, wherein the user public key of the user endpoint is used to encrypt the file after the file is obtained from the content server by the user device, and a user private key of the user endpoint is used to decrypt the file when the user device accesses the file.

4. The method of claim 3, wherein the user device comprises an access module and a storage module on which the user public key and the user private key are stored; and in the step (B), the first public key in the smart contract corresponding to the file access token is replaced by the access module with the user public key stored in the storage module; after the access module obtains the file from the content server, the file is encrypted by the access module with the user public key and then stored in the storage module; and when the access module accesses the file, the file is decrypted with the user private key stored in the storage module by the access module.

5. The method of claim 1, wherein the blockchain network further comprises an information endpoint corresponding to an information server; in response to a request to obtain an information from the information server or a request to input an information into the information serve made by the user device, the smart contract authenticates the file access token of the user endpoint.

6. A file access authorization system based on a blockchain network having at least one user endpoint corresponding to a user device, and at least one content supply endpoint corresponding to a content server, the user device comprising:
   an access module; and
   a storage module electrically coupled to the access module;
   wherein, in response to a request made by the user device to access a file in the content server, the access module obtains a first public key and a first private key from a machine-readable medium and is connected to a smart contract stored on the blockchain network through the first public key, wherein the smart contract comprises at least one file access token corresponding to the first public key; the access module signs the smart contract with the first private key for transferring the file access token corresponding to the first public key to the user endpoint; the smart contract, after having authenticated the file access token of the user endpoint, provides a link for the user device to access the file in the content server.

7. The system of claim 6, wherein the storage module is configured to store a user public key and a user private key, when a request to access the file in the content server is made by the user device, the first public key corresponds to the file access token of the smart contract is replaced by the access module with the user public key; after the access module obtains the file from the content server, the file is encrypted by the access module with the user public key and then stored in the storage module; and when the access module accesses the file, the file is decrypted by the access module with the user private key stored in the storage module.

8. A file storage device based on a blockchain network having at least one user endpoint corresponding to the storage device, and at least one content supply endpoint corresponding to a content server, wherein the storage device is connected with the blockchain network through an access device;
   wherein, in response to a request made by the storage device or the access device to access a file in the content server, the access device obtains, from a machine-readable medium, a first private key and a first public key and is connected to a smart contract stored on the blockchain network through the first public key, wherein the smart contract comprises at least one file access token corresponding to the first public key;

the access device signs the smart contract with the first private key for transferring the file access token corresponding to the first public key to the user endpoint; the smart contract, after having authenticated the file access token of the user endpoint, provides a link for the storage device to access the file in the content server.

9. The file storage device of claim 8 further comprising a computing unit, a signature unit configured to store a user public key and a user private key, a memory unit configured to store the file obtained from the content server, a communication unit communicatively connected to the access device, and a power supply unit configured to supply power to the computing unit, the signature unit, the memory unit, and the communication unit; wherein the computing unit is electrically connected to the signature unit, the memory unit, the communication unit, and the power supply unit.

10. The file storage device of claim 9, wherein in response to a request to access the file in the content server made by the storage device, the first public key corresponding to the file access token of the smart contract is replaced by the access device with the user public key stored in the signature unit; after the access device obtains the file from the content server, the file is encrypted by the computing unit with the user public key and then stored in the memory unit; and when the access device accesses the file, the file is decrypted by the computing unit with the user private key stored in the signature unit.

* * * * *